United States Patent
Vogel et al.

(10) Patent No.: US 6,807,515 B2
(45) Date of Patent: Oct. 19, 2004

(54) WIRELESS NETWORK MONITORING

(75) Inventors: Andreas Vogel, San Francisco, CA (US); Mark E. Adams, Cupertino, CA (US); Andrew S. Brenner, Los Altos, CA (US); Noah B. K. Suojanen, Redwood City, CA (US)

(73) Assignee: Telephia, Inc., San Francisco, CA (US)

(*) Notice: Subject to any disclaimer, the term of this patent is extended or adjusted under 35 U.S.C. 154(b) by 0 days.

(21) Appl. No.: 09/953,488

(22) Filed: Sep. 14, 2001

(65) Prior Publication Data

US 2002/0077786 A1 Jun. 20, 2002

Related U.S. Application Data

(60) Provisional application No. 60/287,944, filed on Apr. 30, 2001, and provisional application No. 60/232,936, filed on Sep. 15, 2000.

(51) Int. Cl.[7] .................................................. H04Q 7/34
(52) U.S. Cl. ....................... 702/188; 702/182; 702/183; 455/67.11
(58) Field of Search ................................. 702/182, 188, 702/122, 176, 178, 179, 181, 183, 186, FOR 103, FOR 104, FOR 134, FOR 135, FOR 139, FOR 154, FOR 170, FOR 171; 455/423–425, 9, 67.11; 370/252, 242, 245; 709/224; 379/900; 340/426.2, 3.1

(56) References Cited

U.S. PATENT DOCUMENTS

| | | | |
|---|---|---|---|
| 5,425,076 A | 6/1995 | Knippelmier | 379/27 |
| 5,644,623 A | 7/1997 | Gulledge | 455/423 |
| 5,675,371 A | 10/1997 | Barringer | 348/6 |
| 5,793,753 A | 8/1998 | Hershey et al. | 370/252 |
| 5,987,306 A | 11/1999 | Nilsen et al. | 455/67.1 |
| 6,169,896 B1 | 1/2001 | Sant et al. | 455/424 |
| 6,314,108 B1 * | 11/2001 | Ramasubramani et al. | 370/465 |
| 6,430,160 B1 * | 8/2002 | Smith et al. | 370/252 |
| 6,445,916 B1 | 9/2002 | Rahman | 455/423 |
| 6,545,994 B2 * | 4/2003 | Nelson, Jr. et al. | 370/337 |
| 2001/0041566 A1 | 11/2001 | Xanthos et al. | 455/423 |
| 2002/0006791 A1 * | 1/2002 | Nyholm | 455/423 |
| 2002/0015398 A1 | 2/2002 | Kikinis | 370/338 |

* cited by examiner

*Primary Examiner*—Hal D Wachsman
(74) *Attorney, Agent, or Firm*—Gray, Cary, Ware & Freidenrich LLP

(57) ABSTRACT

A system and method are disclosed for monitoring performance of a wireless network. A probe server controls posts to send and receive probes of the wireless network. Wireless devices at the posts send the probes to the wireless network and receive probes from the wireless network. These probes provide feedback information, which indicates how the wireless network is performing.

24 Claims, 13 Drawing Sheets

WIRELESS NETWORK MONITORING

RELATED APPLICATION

This application claims priority under 35 U.S.C. §119(e) from U.S. patent application Ser. No. 60/232,936, entitled, "Performance Measurement For Wireless Devices," by Noah Suojanen, Andreas Vogel, Andrew Brenner, and Mark Adams, filed Sep. 15, 2000, which is incorporated by reference in its entirety. This application also claims priority under 35 U.S.C. §119(e) from U.S. patent application Ser. No. 60/287,944, entitled, "Network Monitoring System," by Andreas Vogel, Noah Suojanen, Andrew Brenner, and Mark Adams, filed Apr. 30, 2001, which is incorporated by reference in its entirety.

BACKGROUND

A. Technical Field

This invention generally relates to network monitoring and more particularly to systems and methods for monitoring the reliability and performance of wireless data applications and services.

B. Background of the Invention

Wireless data systems hold the promise of access to data on a wireless network from anywhere at anytime. However, implementation of wireless data services has not been without problems. The wireless network is a patchwork of networks operated by competing carriers and often using non-interoperable technologies.

On the wireless network, there are multiple different data protocols and systems. Different protocols used include HyperText Transfer Protocol (HTTP), Wireless Application Protocol (WAP), Post Office Protocol, Version 3 (POP3), Interactive Mail Access Protocol (IMAP), Short Message Services (SMS), and Simple Mail Transfer Protocol (SMTP). Different wireless protocols used include Time Division Multiple Access (TDMA), Code Division Multiple Access (CDMA), Global System for Mobile communications (GSM), Personal Digital Cellular (PDC), Integrated Digital Enhanced Network (iDEN), and Personal Communications Service (PCS). Further, there are many different carriers that implement the protocols and systems on their own wireless networks, which form pieces of the overall wireless network. The wireless network lacks a common communications stack such as TCP/IP across carriers. The solutions used, and the underlying transport mechanisms vary widely.

As a result of the complicated structure of the wireless network, the end-user frequently experiences long delays and failures when trying to access or use the wireless network. These problems will likely increase as the wireless network migrates to 2.5 and $3^{rd}$ generation systems, since the newer technologies are more complex than the technologies they replace, and with the introduction of new multimedia applications that are sensitive to quality of service.

Accordingly it is desirable to provide a monitoring system and method for measuring wireless service availability and performance. Such a system and method would provide a systematic way to discover problems and allow their correction.

SUMMARY OF THE INVENTION

The described embodiments of the present invention monitor a wireless network.

One embodiment is a method for monitoring a wireless network. A plurality of probes, each with an identifier and a destination, is generated. Each of the probes is sent from an originator to the wireless network. Each successful probe is received from the wireless network at the destination. Feedback information for each of the plurality of probes is recorded. The recorded feedback information is indicative of the performance of the wireless network.

Another embodiment is another method for monitoring the wireless network. A plurality of probes, each requesting desired information from a target, is generated. Each of the probes is sent to the wireless network. For each of the plurality of probes, feedback information is recorded. The recorded feedback information is indicative of the performance of the wireless network.

Another embodiment is a system for monitoring the wireless network. The system includes a probe server. The probe server receives instructions for how to monitor the wireless network. The probe server is connected to a plurality of posts. The probe server sends commands to the plurality of posts. Each post includes a plurality of wireless devices. The wireless devices send probes to the wireless network. The wireless devices also receive feedback information from the wireless network.

DETAILED DESCRIPTION OF PREFERRED EMBODIMENTS

The described embodiments of the present invention monitor the service availability and performance of a wireless network by measuring various aspects of the wireless network. The measured, monitored performance of the wireless network is presented to a user.

System Overview

Figure 1:
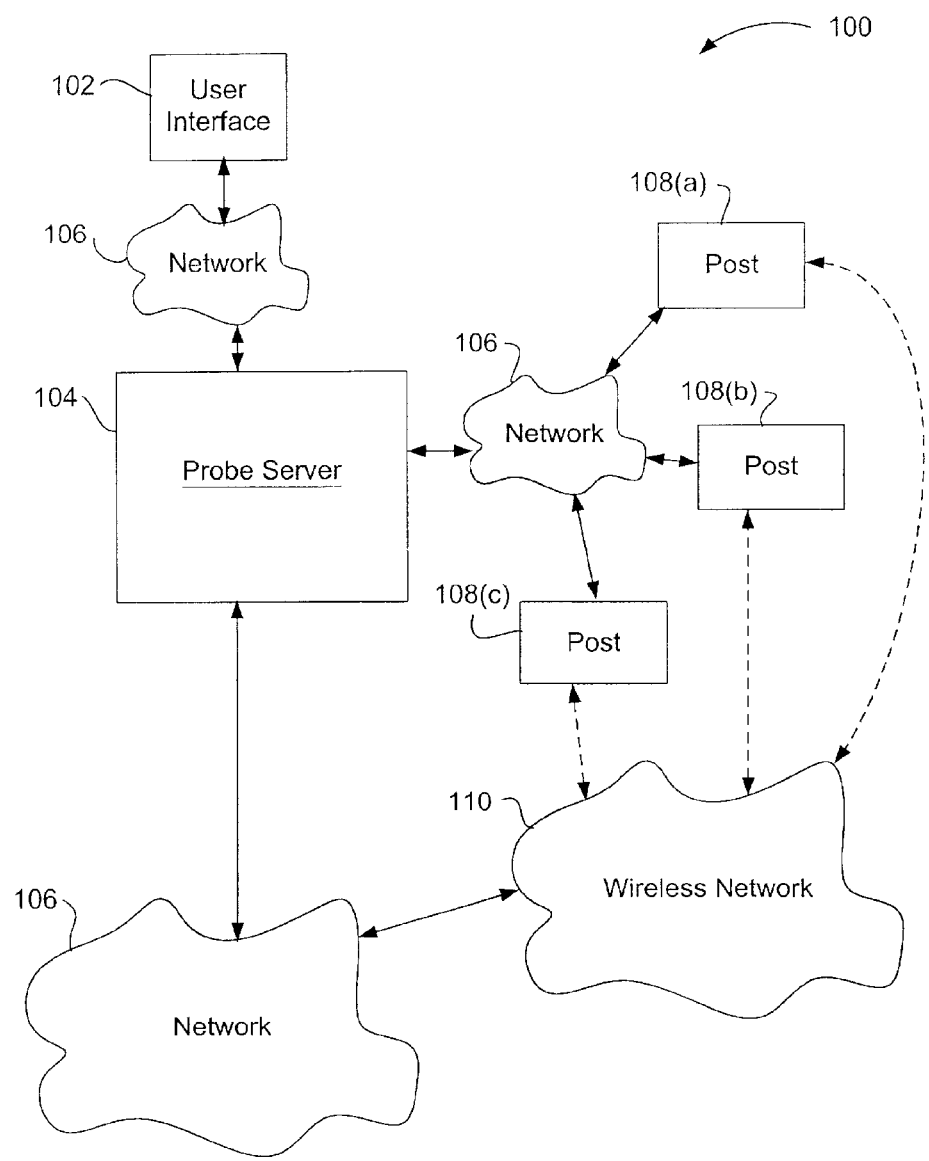
FIG. 1 is a block diagram of an embodiment of a system for monitoring wireless networks.

FIG. 1 is a block diagram of an embodiment of a system 100 for monitoring wireless networks. The system 100 includes a user interface 102. The user interface 102 communicates with a probe server 104. In the embodiment shown in FIG. 1, the user interface 102 communicates with the probe server 104 via a network 106. One suitable network 106 is the Internet, although other networks may also be used. In one embodiment, the user interface 102 is a web browser running on a personal computer. Alternatively, the user interface 102 may a directly communicate with the probe server 104 without the use of a network 106.

The probe server 104 communicates with a plurality of posts 108. Three posts 108(*a*), 108(*b*), and 108(*c*) are shown in FIG. 1, although different numbers of posts 108 may be used in different embodiments of the system 100. The posts 108 communicate wirelessly with a wireless network 110 that is to be monitored by the system 100. The probe server 104 also communicates with the wireless network 110, via the network 106 in the embodiment shown in FIG. 1. While the network 106 is shown as being one network between components of the system 100, in some embodiments different networks may be used between the user interface 102 and the probe server 104, the probe server 104 and the posts 108, and between the probe server 104 and the wireless network 110.

In general, the user enters monitoring parameters into the probe server 104 via the user interface 102. In response to the entered parameters, and under commands from the probe server 104, one or more probes are sent through the wireless network 110 by either the probe server 104 or a post 108. These probes prompt the wireless network 110 to respond with feedback information. This feedback information in the described embodiment can take the form of: (a) the probe itself, which has been transmitted through the wireless network 110; (b) information that has been received from the wireless network 110 in response to the probe; (c) information generated by the system 100 in connection with the sending and/or receiving of the probe or information received from the wireless network 110 in response to the probe; or (e) a combination of types of feedback information. However, the feedback information is not limited to such information in other embodiments, and can include, for example, information sent from the wireless network 110 to the user interface 102. The feedback information is received either at the probe server 104 or a post 108. If the feedback information is received at a post 108, the feedback information is forwarded to the probe server 104. The probe server 104 uses the feedback information to determine the performance of the wireless network 110.

The user uses the user interface 102 to enter the parameters defining how the system 100 is to monitor the wireless network 110. These parameters can include what parts of the wireless network 110 the system 100 should monitor, what types of probes the system 100 should send through the wireless network 110, the number and frequency of the probes, and other information. The parts of the wireless network 110 the system 100 can monitor include one or more specific carriers, one or more specific systems, and one or more specific geographic areas. The types of probes the system 100 sends through the wireless network 110 include various types of push and pull probes. The user specifies the number and frequency of probes sent by the system through the wireless network 110.

The user interface 102 passes the parameters entered by the user to the probe server 104 via the network 106. The probe server 104 then initiates the generation of probes. One way probes are initiated is by sending commands to the posts 108 via the network. The commands prompt the posts 108 to send probes to the wireless network 110. Another way probes are initiated is by the probe server 104 sending probes to the wireless network 110 via the network 106 using SMTP, HTTP, TAP, and other gateways and interfaces.

The wireless network 110 responds to the probes with feedback information. This feedback information may arrive at a post 108, the probe server 104, or both. If a post 108 receives the feedback information in response to the probe, the feedback information may arrive at the post 108 that sent the probe or a different post 108. In either case, the post 108 that receives the feedback information sends the feedback information to the probe server 104 via the network. Thus, the probe server 104 receives the feedback information in response to the probe whether the feedback information is initially received at the probe server 104 or a post 108. The probe server 104 records the feedback information, which is indicative of the performance of the wireless network 110. The probe server 104 may then generate reports detailing the performance of the wireless network 110. The probe server 104 may also send the feedback information or the reports detailing the performance of the wireless network 110 to the user via the user interface 102.

Probe Server

Figure 2:
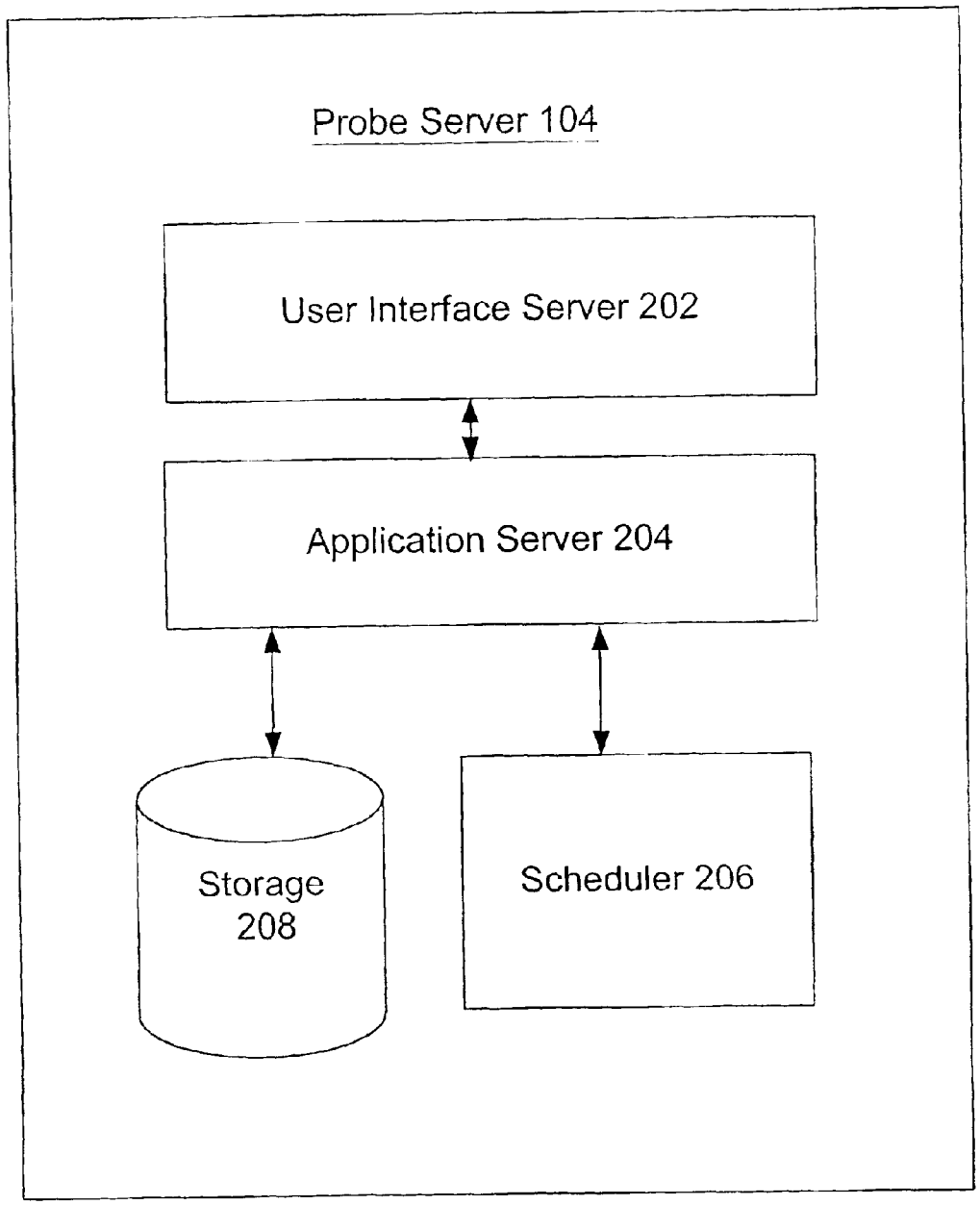
FIG. 2 is a block diagram detailing the probe server.

FIG. 2 is a block diagram detailing the probe server 104. The probe server 104 comprises a user interface server 202, an application server 204, a scheduler 206, and storage 208.

The user interface server 202 communicates with the user interface 102. In one embodiment, the user interface 102 is a web browser operating on a personal computer. In that embodiment, the user interface server 202 acts as a web server, and provides web pages to the user interface 102. These web pages allow the user to enter the parameters that direct how the probe server 104 probes the wireless network 110. The user interface 102 in turn sends these parameters to the probe server 104. The parameters are received at the probe server 104 by the user interface server 202. The user interface server 202 sends the parameters to the application server 204. The application server 204 processes the parameters and communicates with the scheduler 206, which forms a schedule of probes based on the parameters. According to this schedule and the parameters, the application server 204 sends commands to posts 108 to generate and send probes to the wireless network 110. Alternatively, the application server 204 generates probes and sends the probes to the wireless network 110.

The application server 204 also receives the feedback information produced by the no wireless network 110 in response to the probes. The probe server 104 may receive the feedback information from the wireless network 110 via the network 106. Alternatively, a post 108 may receive the feedback information from the wireless network 110 and forward the feedback information to the probe server 104.

The feedback information, and data gained from the feedback information, is stored in storage 208. The storage 208 is a hard disk drive or other computer-readable storage medium. The application server 204 uses the information in storage 208 to provide information on the performance of the wireless network 110 to the user. To do this, the application server 204 retrieves the information stored in storage 208. The application server 204 can then send the raw data from storage 208 to the user interface server 202, which then sends the data to the user interface 102 for use by the user. The application server 204 can also use the information from storage 208 to generate reports summarizing the performance of the wireless network 110. These reports are then sent to the user interface server 202, which sends the reports to the user interface 102 for use by the user. Thus, the probe server 104 allows the user to monitor the wireless network 110.

Post

Figure 3:
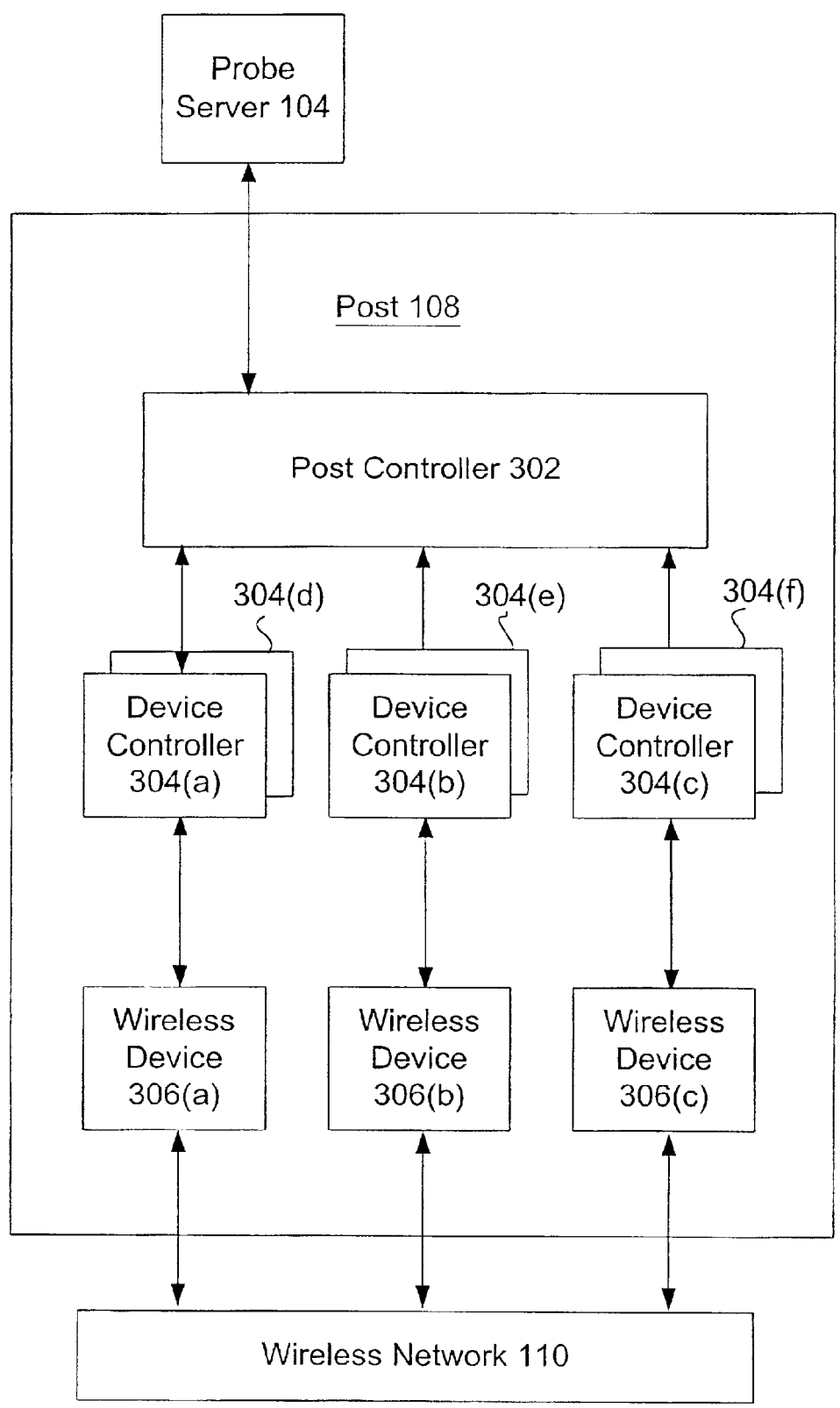
FIG. 3 is a block diagram detailing a post.

FIG. 3 is a functional block diagram detailing a post 108. The post 108 comprises one or more post controllers 302, device controllers 304, and wireless devices 306. In the described embodiment, the post controller 302 is software, although in other embodiments, the post controller 302 may be hardware or firmware. The post controller 302 receives commands from the application server 204 of the probe server 104. These commands tell the post controller 302 to generate probes, what type of probes to generate, and what aspects of the wireless network 110 the probes should monitor. After receiving the commands, the post controller 302 schedules and generates probes and sends the probes to the proper device controller 304 or several device controllers 304. Each post 108 has a clock in the post controller 302 that is synchronized with a clock in the probe server 104. In one embodiment, the system 100 measures and records times, and synchronizes the clocks, to the closest millisecond. In addition, the post controller 302 sends the feedback information that arrives at the wireless devices 306 from the wireless network 110 to the application server 204 of the probe server 104.

The device controllers 304 are connected to the post controller 302 and to the wireless devices 306. In one embodiment, the device controllers 304 are software. However, in other embodiments, the device controllers 304 may also be hardware or firmware. The device controllers 304 control the wireless devices 306 of the post 108 and act to channel information between the post controller 302 and the wireless devices 306. The device controllers 304 also act as an interpreter between the post controller 302 and the wireless devices 306, allowing the post controller to send and receive information with the wireless devices 306. The device controllers 304 also alert the post controller 302 when information is received by the wireless devices 306. The post controller 302 generates and schedules probes, or receives scheduled probes from the probe server 104. At the scheduled time, the post controller 302 sends each probe to a device controller 304 that controls the wireless device 306 that will send the probe to the wireless network 110. The device controller 304 sends the probe to the wireless device 306, which wirelessly sends the probe to the wireless network 110. The device controller 304 also functions to send feedback information received by the wireless device 306 from the wireless network 110 to the post controller 302, which sends the feedback information to the probe server 104. In performing this function, the device controller 304 also translates the feedback information to a form used by the post controller 302 and probe server 104.

In one embodiment, there are two general types of device controllers 304. A first type of device controller 304 controls a wireless device 306 when a pull probe is sent to the wireless network 110. A second type of device controller 304 controls a wireless device 306 when a push probe is sent to the wireless network 110. In addition, there are multiple different wireless devices 306. Typically, each different type of wireless device 306 requires different command signals to control the devices. For example, a wireless device 306 from a first manufacturer requires different command signals than a wireless device 306 from a second manufacturer. Therefore, each device controller 304 is configured to correctly communicate with the corresponding wireless device 306 connected to that device controller 304. FIG. 3 shows each wireless device 306 being connected to a single device controller 304. For example, device controller 304(a) is connected to wireless device 306(a). However, each wireless device 306 may be connected to other device controllers 304, depending on the type of probe. Device controller 304(a) is a first device controller 304 that controls wireless device 306(a) when wireless device 306(a) sends pull probes to the wireless network 110. When wireless device 306(a) sends push probes, another device controller 304(d) controls the wireless device 306(a) in place of device controller 304(a). In FIG. 3, device controllers 304(a), 304(b), and 304(c) are used for pull probes and device controllers 304(d), 304(e), and 304(f) are used for push probes. Similarly, wireless device 306(b) can be a different type of wireless device 306 than wireless device 306(a). Thus, the device controller 304(b) that controls wireless device 306(b) can be different than the device controller 304(a) that controls wireless device 306(a), even if both device controller 304(a) and device controller 304(b) are device controllers 304 used for pull probes.

The wireless devices 306 are connected to the device controllers 304. The wireless devices 306 may be wireless telephones, wireless modems, or other types of wireless devices 306. In the embodiment illustrated in FIG. 3, there are three wireless devices 306(a), 306(b), and 306(c), controlled by six device controllers 304(a), 304(b), 304(c), 304(d), 304(e), and 304(f), respectively. As mentioned above, for different types of probes, the wireless devices 306(a), 306(b), and 306(c) are controlled by different device controllers 304. While FIG. 3 shows the post 108 having three wireless devices, fewer or more wireless devices 306 with their associated device controllers 304 are used in alternative embodiments.

The wireless devices 306 in the post 108 are chosen to allow monitoring and measuring of the desired wireless network 110. Thus, if the wireless network 110 of a particular carrier is to be monitored, wireless devices 306 that use that carrier's network are chosen to send probes. To monitor the wireless networks 110 of multiple carriers, different types of wireless devices 306 are chosen to send probes to the different wireless networks 110. In some embodiments, the different wireless devices 306 of the post 108 are chosen so that the post 108 has the capability to monitor multiple carriers, protocols, and systems. This entails choosing wireless devices 306 operable with different carriers, and capable of operating with different protocols and systems. In addition, redundant wireless devices 306 are included in the post 108, to help ensure continual monitoring of the wireless network 110 should one wireless device 306 fail.

In addition to sending probes to the wireless network 110, the wireless devices 306 receive feedback information from the wireless network 110. When a wireless device 306 receives feedback information from the wireless network 110, the wireless device 306 sends the feedback information to the attached device controller 304. The device controller 304 translates the feedback information to a form used by the post controller 302 and probe server 104. The device controller 304 then sends the feedback information to the post controller 302, which sends the feedback information to the probe server 104. In other embodiments, the feedback information travels from the wireless device to the probe server via different paths.

In one physical embodiment, the post 108 comprises four personal computers networked together and connected to the probe server 104 via the network 106. Each personal computer has sixteen attached wireless devices 306. There is one post controller 302 for each personal computer. The personal computers communicate with the application server 204 of the probe server 104 via the post controllers 302. The wireless devices 306 communicate with the personal computers via the device controllers 304 and the wireless network 110.

The physical location of the post 108 is chosen to be an area where wireless communication with the wireless network 110 is known to function well, to ensure the performance of the wireless network 110 is being monitored, not simply reception performance of wireless devices 306. The physical location of the post 108 is also chosen so that the post may monitor a desired area For example, the physical location of the post 108 may be a metropolitan area where a user wishes to monitor wireless network 110 performance. In one embodiment of the system 100, three posts 108 are placed in different locations of a metropolitan area for monitoring of the wireless network 110 in that particular metropolitan area. Multiple metropolitan areas can also be monitored by placing three posts 108 in each metropolitan area. In other embodiments, different numbers and locations of posts 108 are used. For example, in one embodiment, there is a post 108 for each cell of the wireless network 110. Multiple posts 108 within one metropolitan area, or the monitoring of multiple metropolitan areas provide the ability to compare data to determine if a problem is local, or if the problem is affecting a wider area. This allows the user to better determine the causation of problems.

Probes

In general, there are two types of probes: push probes and pull probes.

Push probes are generally "pushed" from a source (the "originator") through the wireless network 110 to a target (the "receiver"). Generally, the originator and the receiver are different devices, although it is possible for the target to be the same device. Examples of push probes include a push SMS message sent from an originator to a receiver, and a SMTP mail message. In the system 100 for monitoring wireless networks, the push probe is sent to the wireless network from the originator (either a wireless device 306 or the probe server 104), and is received at a later time at the receiver (another wireless device 306 or the probe server 104). The probe is "pushed" through the wireless network 110 from the originator to the receiver.

There are several possible types of feedback information the system 100 can gain from a push probe. In some embodiments, the probe includes information indicating what types of feedback information should be recorded. Generally, the push probe feedback information is in the form of times that events occur. For an SMS push probe, for example, several different times can be marked, recorded, and used as feedback information. The originator can record the time the probe is sent to the wireless network 110. The local mail server can record and return to the originator the time the probe arrives at the local mail server. The wireless carrier can record and return to the originator the time the probe arrives at the carrier gateway from the local mail server, the time the probe gets to the processing sender from the carrier gateway, and the time the probe is sent to the receiver. The receiver can record the time the probe arrives at the receiver. This information is sent to the probe server 104 by the originator or the receiver. The probe server 104 then stores the information in storage 208.

Since the probe server 104 stores all these times, the probe server 104 can provide the user with the time the push probe took to travel from originator to local mail server, the total time the push probe took to travel from originator to receiver, or with the time taken for other measured events to occur. The system 100 also measures failure rates of push probes. A failure is a push probe that is not received by the receiver before the expiration of a predetermined time after the push probe is originated.

Pull probes, in contrast, generally involve only one device. The device "pulls" information from the wireless network 110. The probe is a request for information from the wireless network 110. The device establishes contact with the wireless network 110 and sends the request for information to the wireless network 110. The requested information is received at the same device.

Examples of pull probes include WAP probes and HTTP probes, where information is "pulled" from a WAP site or an HTTP address. The pull probe is sent to the wireless network 110 from an originator (either a wireless device 306 or the probe server 104) and comprises a request for a response from a target in the wireless network 110. Information is returned to the originator from the wireless network 110 in response to the pull probe. The probe "pulls" information from the target in the wireless network 110. Tis target is a WAP site, an HTTP address, or another target.

Pull probes also generate several types of feedback information. In some embodiments, the pull probe includes information that indicates which types of feedback information the originator should record. As with push probes, the feedback information of pull probes is generally the times that events occur. For a WAP pull probe, for example, several different times can be marked, recorded, and used as feedback information. The originator can record the time the pull probe is sent to the wireless network 110. The originator can record the time the carrier acknowledges the call as an authenticated data call, the time the browser starts up, the time the browser authentication is completed, the start of reception of the homedeck, including each component (text, images, and pre-fetches) of the homedeck, and the completion of reception of the homedeck, including each component. The originator can also record the time the requested information arrives back at the originator from the wireless network 110. Failures to successfully "pull" the requested information from the wireless network 110 can also recorded.

For an HTTP pull probe, for example, other times can be marked, recorded, and used as feedback information. In an HTTP pull probe, information is requested from a target URL. The originator can receive from the wireless network 110 and record the time it takes to establish a TCP/IP connection with the HTTP server, the time it takes to translate the URL into an IP address by a DNS server, and when this translation starts. The originator can record the time the web page (the requested information) begins to arrive at the originator, the time the reception of the web page is completed, the time the originator asks for and receives each embedded URL (such as images) in the target, as well as the time each embedded URL is translated into an IP address by a DNS server and how long each translation takes. In alternate embodiments, other feedback information can also be received.

In some embodiments, other checkpoints are measured, including when a connection is established between the originator and the wireless network 110, when the request for information is sent, when the first byte of the information is received, when the last byte of the information is received, and when the connection is broken between the originator and the wireless network 110.

As with a pull probe, once the feedback information is stored at the probe server 104, the probe serve 104 can provide the user with the time it takes for the recorded events to occur.

What follows are more detailed descriptions of the methods performed by the system 100 to monitor the wireless network 110 through the use of push and pull probes.

Gathering Feedback Information

Figure 4:
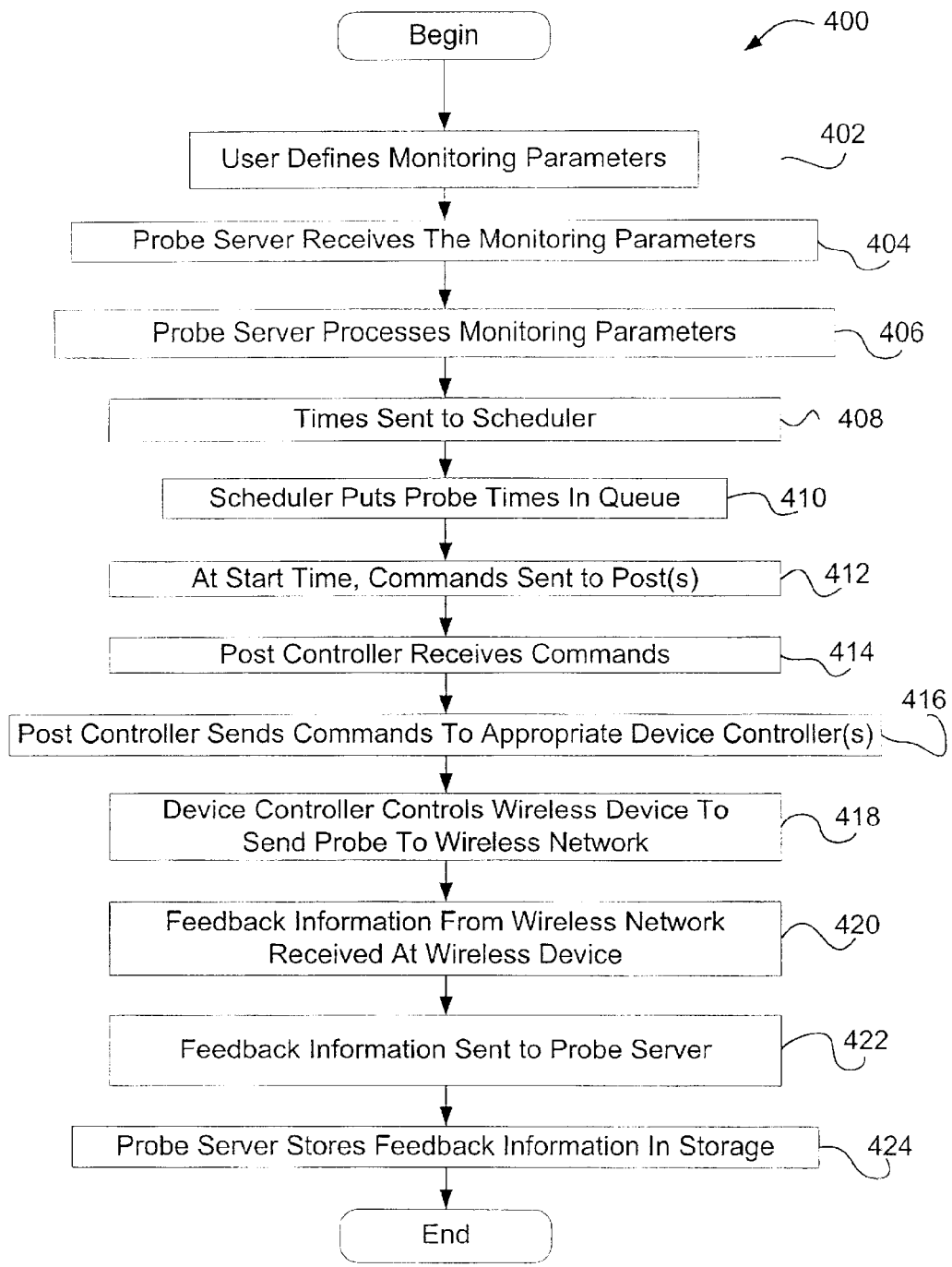
FIG. 4 is a flow chart describing the execution of a pull probe by a wireless device in the wireless network monitoring system.

FIG. 4 is a flow chart 400 describing the execution of a pull probe by a wireless device 306 in the wireless network monitoring system 100. The user first defines 402 the monitoring parameters. The user defines the monitoring parameters by entering the parameters into the user interface 102, which sends the monitoring parameters to the probe server 104. Pull probes "pull" information from a target site within the wireless network 110. Therefore, one of the monitoring parameters is a specification of the target site within the wireless network 110 from which the probe will "pull" information. This specification can be a URL (Uniform Resource Locator), WAP address, or other specification. The user can also choose to define monitoring parameters including: a carrier to monitor, which posts 108 will send the probes, at what time to begin sending the pull probes to the wireless network 110, the frequency of repeat pull probes, the total number of pull probes to perform, the desired information to record, or other parameters.

The user interface server 202 of the probe server 104 receives 404 the monitoring parameters from the user interface 102. The user interface server 202 sends the monitoring parameters to the application server 204. The application server 204 processes 406 the parameters to generate times that probes should be sent. The application server 204 sends 408 the generated probe times to the scheduler 206. The scheduler 206 puts 410 the probe times in a queue. Than, at the time a probe is to be sent, the scheduler 206 notifies the application server 204. The application server 204 then sends 412 commands to the post or posts 108 that will send the probe or probes to the wireless network 110.

The post controller 302 of the post 108 receives 414 the commands from the application server 204. The post controller 302 interprets the commands, generates probe commands and sends 416 the probe commands to the appropriate device controller 304 for the wireless device 306 that will send the probes to the wireless network 110. Since it is a pull probe, the post controller 302 sends the commands to a pull probe device controller 304 for the wireless device 306. The device controller 304 that receives the probe commands controls 418 the wireless device 306 to send the probe to the wireless network 110. As discussed previously, a pull probe is a request for information, such as a web page, from the wireless network 110. The wireless device 306 requests information from the wireless network 110 and waits to receive the requested information.

The wireless device 306 receives the requested information, such as a web page, from the wireless network 110. As this occurs, the wireless device 306 also receives 420 the feedback information from the wireless network 110. The feedback information in response to the pull probe can include the information described above with respect to WAP and HTTP pull probes, or other feedback information. As discussed above, this feedback information can include the time that the probe is sent from the wireless device 306, the time a connection is established between the wireless device 306 and the wireless network 110, the time the request for information is sent, the time the first byte of the requested information is received, the time the last byte of the requested information is received, the time the connection is broken between the wireless device 306 and the wireless network 110, as well as other information. Typically, not all the feedback information is received 420 at the wireless device 306 at one time, because the feedback information can comprise the different times that events happen. The feedback information is sent 422 from the wireless device 306 through the device controller 304 and post controller 302 to the probe server 104. In some embodiments, the feedback information is sent 422 to the probe server 104 as the wireless device 306 receives the feedback information. In other embodiments, all the feedback information from a particular pull probe is sent 422 to the probe server 104 at once.

The probe server 104 receives the feedback information and stores 424 the feedback information in storage 208. The pull probe has been completed: the probe caused the wireless network 110 to respond with feedback information, which has been stored at the probe server 104.

Figure 5:
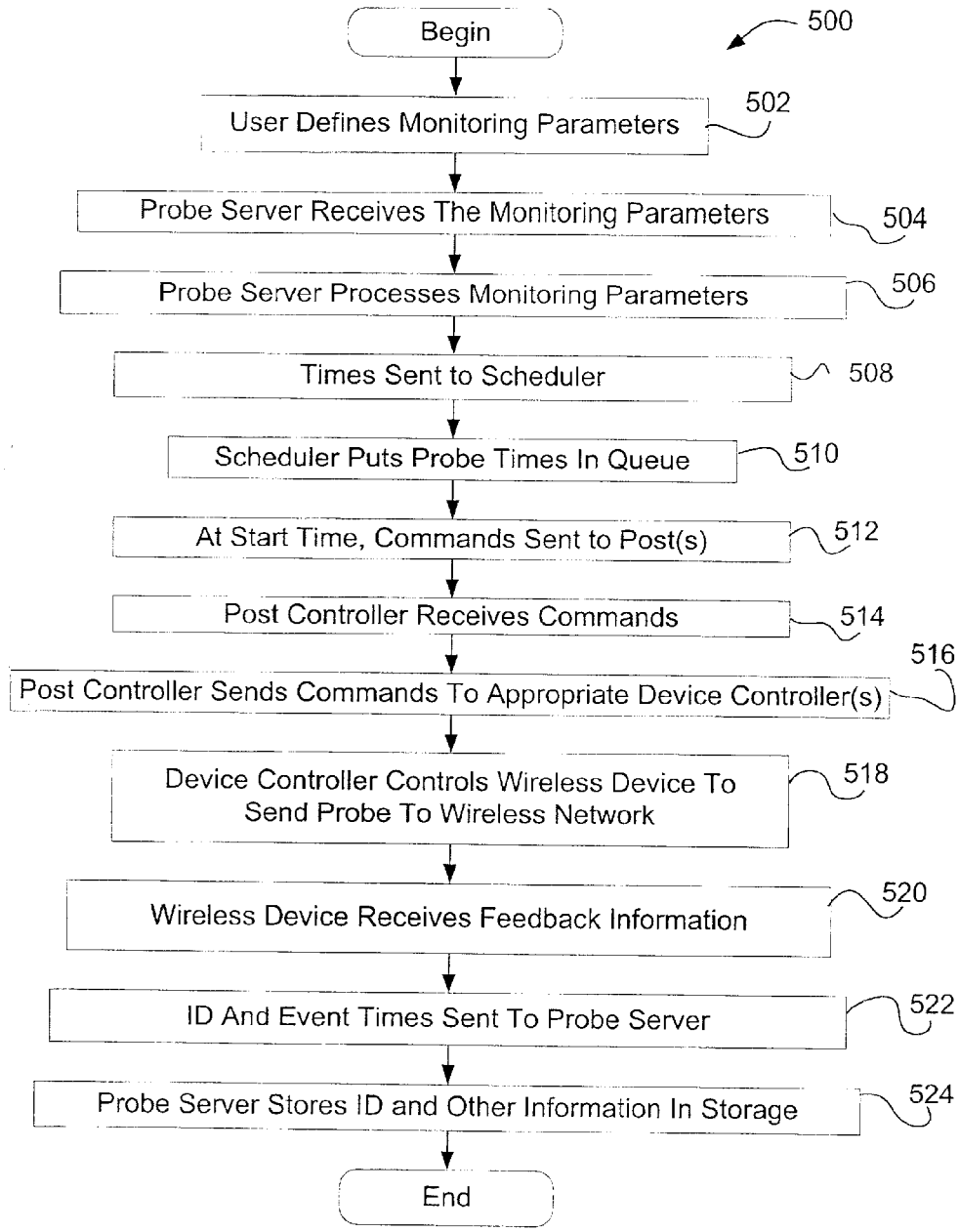
FIG. 5 is a flow chart describing the origination of a push probe by a wireless device in the wireless network monitoring system.

Push probes can be originated by a wireless device 306 or the probe server 104. FIG. 5 is a flow chart 500 describing a push probe originated by a wireless device 306 in the wireless network monitoring system 100. The user first defines 502 the monitoring parameters. The user defines the monitoring parameters by entering the parameters into the user interface 102, which sends the monitoring parameters to the probe server 104. Push probes "push" information through the wireless network 110 to a destination such as another wireless device 306. Therefore, one of the monitoring parameters is a specification of the destination for the push probe. This specification can be a URL (including an email address), a telephone number, or another specification. The user can also choose to define monitoring parameters including: the location of the originating wireless device 306, a carrier through which to send the push probe, and thus which carrier to monitor, which posts 108 will send the probes, at what time to begin sending the push probes to the wireless network 110, the frequency of repeat push probes, the total number of push probes to perform, which event times to record, or other parameters.

The user interface server 202 of the probe server 104 receives 504 the monitoring parameters from the user interface 102. The user interface server 202 sends the monitoring parameters to the application server 204. The application server 204 processes 506 the parameters to generate times that probes should be sent. The application server 204 sends 508 the generated probe times to the scheduler 206. The scheduler 206 puts 510 the probe times in a queue. Then, at the time a probe is to be sent, the scheduler 206 notifies the application server 204. The application server 204 then sends 512 commands to the post or posts 108 that will send the probe or probes to the wireless network 110.

The post controller 302 of the post 108 receives 514 the commands from the application server 204. The post controller 302 interprets the commands, generates probe commands and sends 516 the probe commands to the appropriate device controller 304 for the wireless device 306 that will send the probes to the wireless network 110. Since it is a push probe, post controller 302 sends the commands to a push probe device controller 304 for the wireless device 306. The device controller 304 that receives the probe commands controls 518 the wireless device 306 to send the probe to the wireless network 110. The generated push probe has an identifier that allows the probe server 104 to track that particular push probe and correlate with that particular push probe the information received in response to that push probe, such as the travel time of the push probe.

The wireless device 306 that sends the push probe receives 520 or otherwise determines some types of feedback information. The wireless device 306 that sends the push probe determines the time the push probe is sent. The wireless device 306 that sends the push probe also can receive other types of feedback information that is returned to the originator from the wireless network 110, as discussed above with respect to push probes. These types of feedback information include the time the probe arrives at the local mail server, the time the probe arrives at the carrier gateway from the local mail server, the time the probe gets to the processing sender from the carrier gateway, and the time the probe is sent to the receiver. Typically, not all the feedback is received at the wireless device 306 at one time, since the feedback information can comprise different times that events occur. Thus, the receiving 520 of feedback information typically does not happen all at once.

The identifier for the probe and the other feedback information are sent 522 to the probe server 104 via the device controller 304 and the post controller 302. In some embodiments, the feedback information is sent 522 to the probe server 104 as the wireless device 306 receives the feedback information. In other embodiments, all the received feedback information is sent 522 to the probe server 104 at once. The probe server 104 receives this information and stores 524 the information in storage 208.

Figure 6:
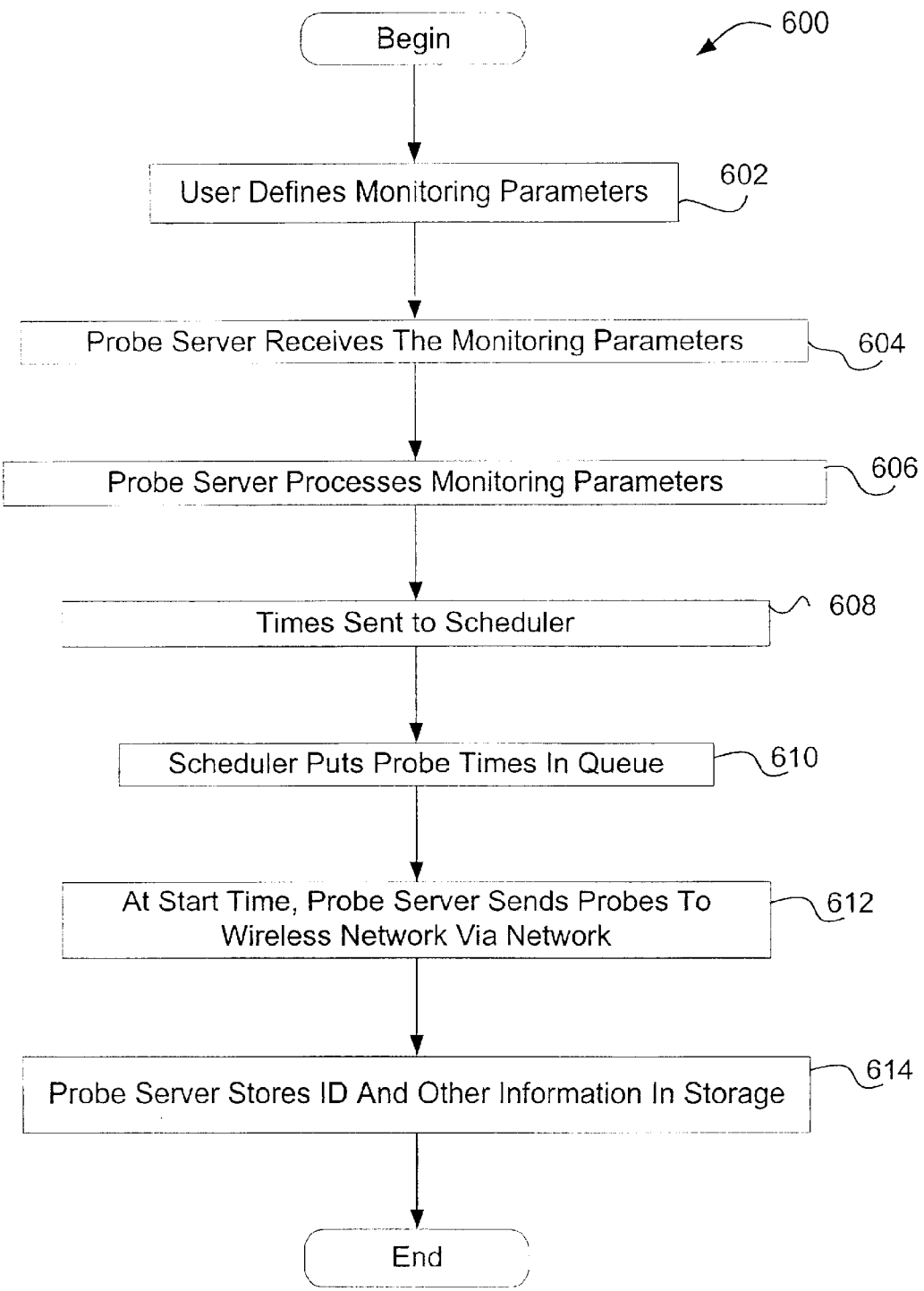
FIG. 6 is a flow chart describing the origination of a push probe by the probe server.

FIG. 6 is a flow chart 600 describing the origination of a push probe by the probe server 104. The user fist defines 602 the monitoring parameters. The user defines the monitoring parameters by entering the parameters into the user interface 102, which sends the monitoring parameters to the probe server 104. Push probes "push" information through the wireless network 110 to a destination. Therefore, one of the monitoring parameters is a specification of the destination for the push probe. This specification can be a URL (including an email address), a telephone number, or another specification. The user can also choose to define which carrier through which to send the push probe, and thus which carrier to monitor, at what time to begin sending the push probes to the wireless network 110, the frequency of repeat push probes, the total number of push probes to perform, what event times to record, or other parameters.

The user interface server 202 of the probe server 104 receives 604 the monitoring parameters from the user interface 102. The user interface server 202 sends the monitoring parameters to the application server 204. The application server 204 processes 506 the parameters to generate times that probes should be sent. The application server 204 sends 608 the generated probe times to the scheduler 206. The scheduler 206 puts 610 the probe times in a queue. Then, at the time a probe is to be sent, the scheduler 206 notifies the application server 204. The application server 204 then sends 612 the push probe to the wireless network 110 via the network 106. The generated push probe has an identifier that allows the probe server 104 to track that particular push probe and correlate with that particular push probe the information received in response to that push probe, such as the travel time of the push probe.

As with the wireless device 306 described in step 520 of FIG. 5, the application server 204 receives some types of feedback information, and sends 614 this information, along with the identifier of the probe, to storage 208. The application server 204 can record the time that the probe is sent. Other types of feedback information that the application server 204 can receive from the wireless network 110 can include the time the probe arrives at the local mail server, the time the probe arrives at the carrier gateway from the local mail server, the time the probe gets to the processing sender from the carrier gateway, and the time the probe is sent to the receiver.

Figure 7:
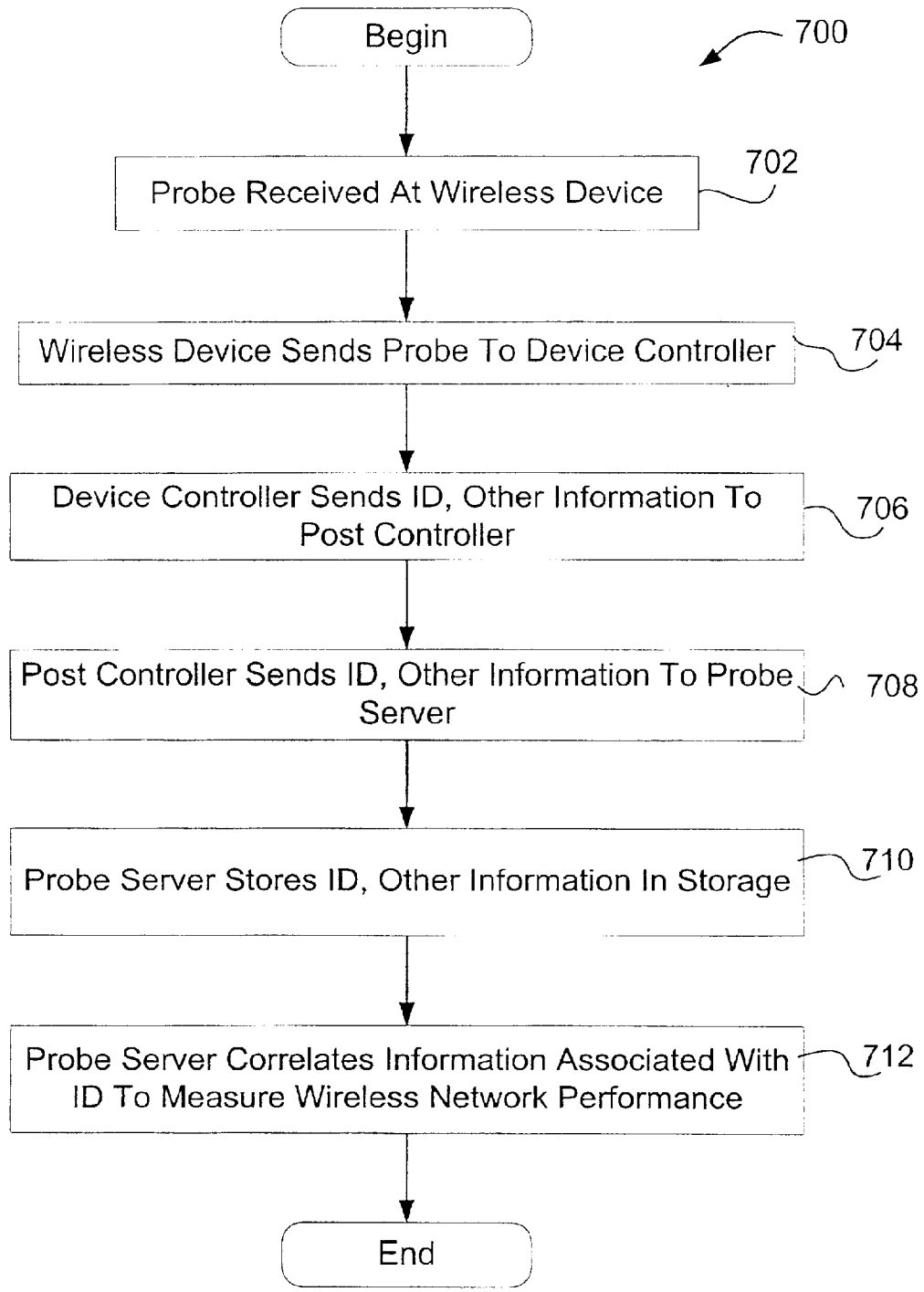
FIG. 7 is a flow chart describing the reception of a push probe at a wireless device.

FIG. 7 is a flow chart 700 describing the reception of a push probe at a wireless device 306 and the gathering of feedback information after the push probe has been "pushed" through the wireless network 110. The push probe originated at a wireless device 306 as above described with respect to FIG. 5, or at the probe server 104 as described above with respect to FIG. 6.

First, the wireless device 306 receives 702 the push probe from the wireless network 110. The wireless device 306 sends 704 the push probe to the device controller 304. The push probe includes the identifier of that particular probe. The device controller 304 receives the push probe and sends 706 the identifier for the push probe and any other information received associated with the push probe to the post controller 302. In some embodiments, the identifier for the push probe is not sent. Instead, the push probe itself is sent, and the post controller 302 or probe server 104 retrieves the identifier from the push probe. The other information received that is associated with the push probe can include the time the push probe arrived at the wireless device 306. The post controller 302, in turn, sends 708 the identifier for the push probe and any other information received to the probe server 104. The probe server 104 receives the information and stores 710 the identifier for the push probe and any other information received in storage 208.

As discussed above with respect to FIGS. 5 and 6, the identifier for the push probe and possibly other feedback information are also stored by the probe server 104 in storage 208 after reception at the probe server 104 from the originator. Thus, the probe server 104 may use the identifier for each push probe to correlate 712 the received identifier for the push probe and any other information received with the stored information that is associated with that particular push probe.

At this point, the probe server 104 has stored a push probe identifier as well as feedback information associated with the push probe. This feedback information can then be used to determine the performance of the wireless network 110. For example, if the both the sending and receiving times of the push probe are recorded, the time it takes to "push" the push probe through the wireless network 110 can be determined. If intermediate times are recorded, such as the time it takes to send a push probe from a wireless device 306 to a local mail server, portions of the path between the originator and receiver can be individually monitored. Further, since the geographical location of the originator and receiver are also stored, the performance of the wireless network 110 in particular locations can also be monitored. Thus, the feedback information can be used to monitor the performance of the wireless network 110.

Figure 8:
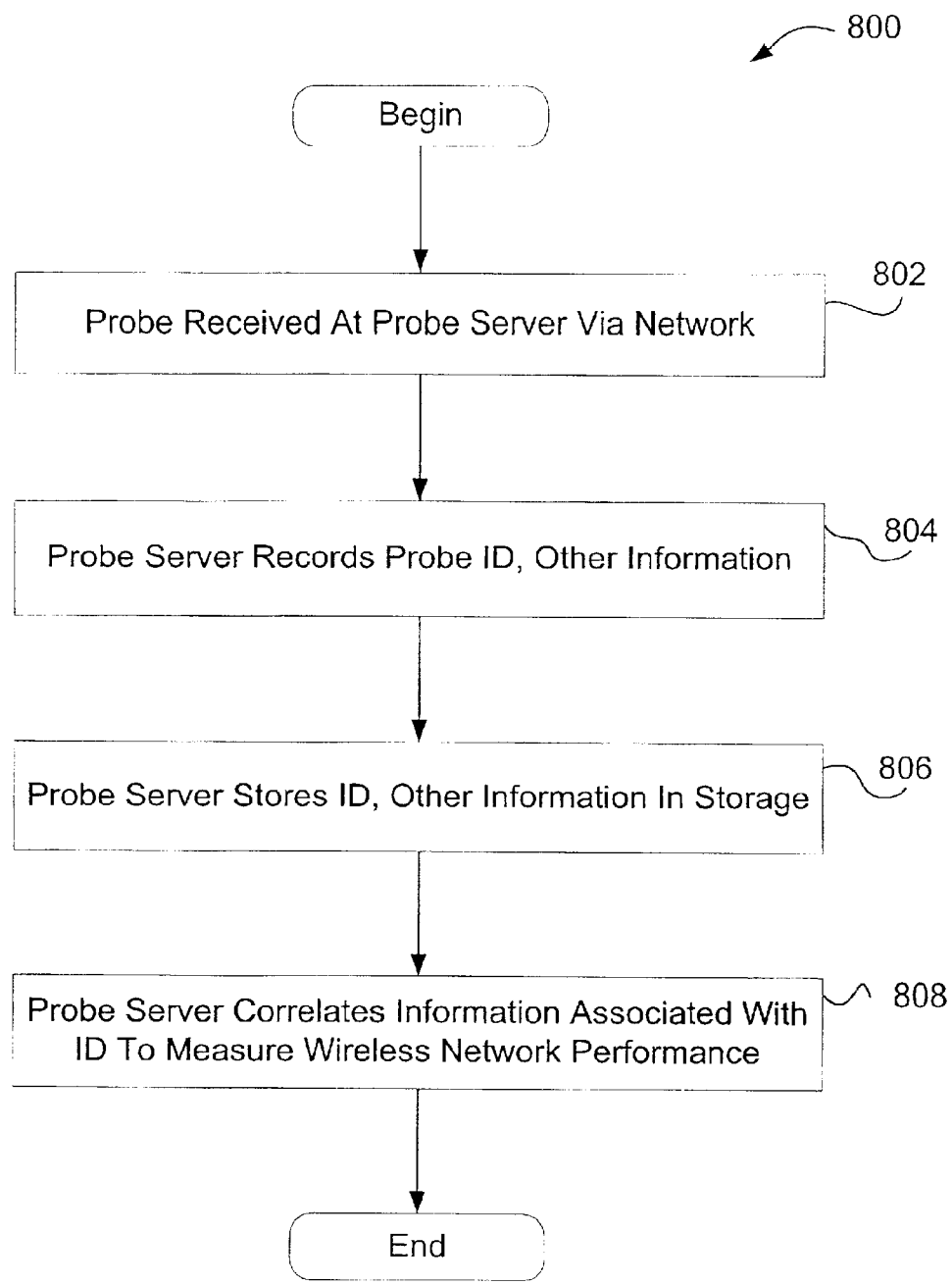
FIG. 8 is a flow chart describing the reception of a push probe at the probe server.

FIG. 8 is a flow chart 800 describing the reception of a push probe at the probe server 104 and the gathering of feedback information after the push probe has been "pushed" through the wireless network 110. The push probe originated at a wireless device 306 as described above with respect to FIG. 5, or at the probe server 104 as described above with respect to FIG. 6.

First, the probe server 104 receives 802 the push probe from the wireless network 110 via the network 106. The push probe includes the probe identifier. The probe server 104 records 804 the identifier for the received push probe and any other information received that is associated with that particular probe. The probe server 104 then stores 806 this information in storage 208.

As discussed above with respect to FIGS. 5 and 6, the identifier for the push probe and possibly other feedback information are also stored by the probe server 104 in storage 208 after reception at the probe server 104 from the originator. Thus, the probe server 104 may use the identifier for each push probe to correlate 808 the received identifier for the push probe and any other information received with the stored information that is associated with that particular push probe.

At this point, the probe server 104 has stored a push probe identifier as well as feedback information associated with the push probe. This feedback information can then be used to determine the performance of the wireless network 110. For example, if both the sending and receiving times of the push probe are recorded, the time it takes to "push" the push probe through the wireless network 110 can be determined. If intermediate times are recorded, such as the time it takes to send a push probe from a wireless device 306 to a local mail server, portions of the path between the originator and receiver can be individually monitored. Further, since the geographical location of the originator and receiver are also stored, the performance of the wireless network 110 in particular locations can also me monitored Thus, the feedback information can be used to monitor the performance of the wireless network 110.

While the described embodiment of the system 100 gathers feedback information as described in the flow charts of FIGS. 4 through 8 and the accompanying text, alternative embodiments of the system 100 may gather feedback information using different steps and processes.

Use of Gathered Information

Through the use of multiple probes, much feedback information is received from the wireless network 110. This information is stored in storage 208 at the probe server 104. To enable the user to benefit from this accumulated information, the gathered feedback information is presented to the user in a variety of ways. In a first way, the user simply requests and receives the compiled "raw" feedback information. When such a request is received at the user interface server 202, the compiled feedback information is sent from storage 208 to the application server 204 to the user interface server 202, which sends the information to the user interface 102 via the network 106. In some embodiments, the compiled feedback information is in a format usable by known third-party data analysis tools, such as database software. Thus, the user may manipulate and study the compiled feedback information as the user desires.

A second way to present the feedback information to the user is through alerts. The user enters specific conditions that will trigger an alert into the user interface 102. One example of such a condition is if a group of push probes take longer than a specified time to travel from originator to receiver. In this example, the time is chosen so that push probes that exceed the time indicate that likely there is a malfunction in the wireless network. When the system 100 detects that the entered conditions have been met, the user is alerted. This alert takes the form of an email, a page or another method. This allows the user to be quickly apprised of poor performance of the wireless network 110.

Figure 9:
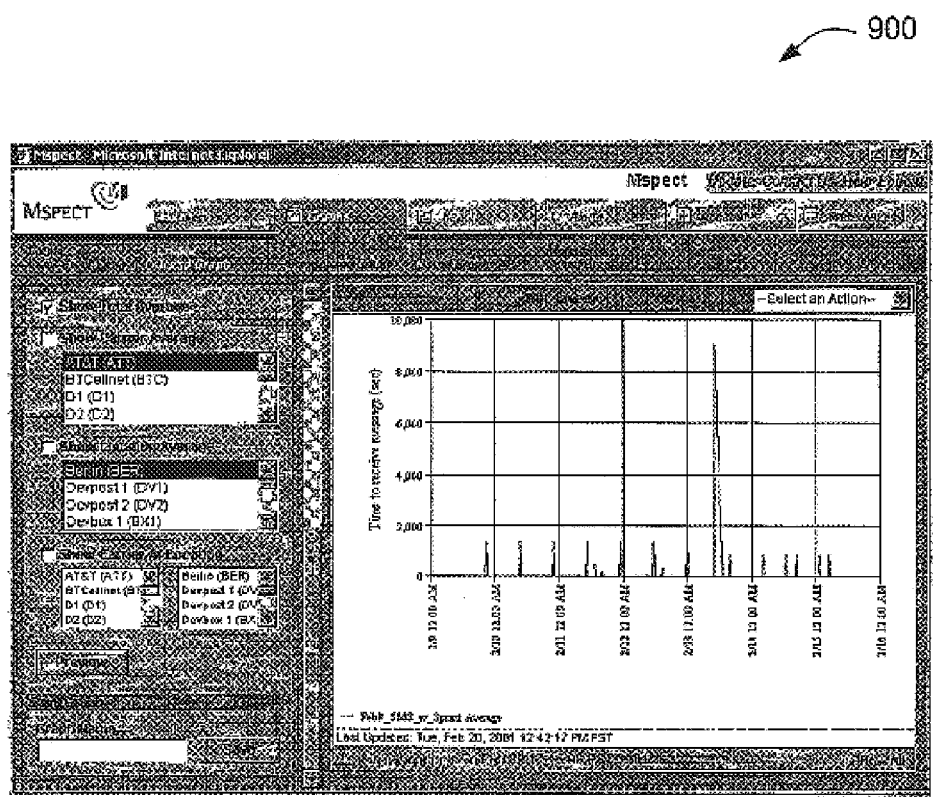
FIG. 9 shows an example graph that provides information on the performance of the wireless network to the user.

A third way to present the feedback information to the user is by a graph. FIG. 9 shows an example graph 900 that provides information on the performance of the wireless network 110 to the user. The user enters a request for a graph 900 into the user interface 102, which sends the request to the user interface server 202 of the probe server 104. The user interface server 202 sends the request to the application server 204. The application server 204 retrieves the feedback information required for the graph from storage 208. The application server 204 sends this information to the user interface server 202, which presents the graph with the feedback information to the user via the network 106 and the user interface 102. In the graph 900 shown in FIG. 9, the feedback information shown in the graph is the time push probes took to reach their specified destination over a specific carrier at different times. The user may also specify that the graph 900 should display other types of information. For example, the user may select time ranges, carriers, physical locations, or other types of information.

Graphs can aid in quick identification of problems with the wireless network 110. Certain patterns in graphs indicate particular problems with the wireless network 110. These patterns are relatively easy to identify in graphs, allowing quick response to problems with the wireless network 110. FIGS. 10 through 13 show four identified graph patterns for SMS probes.

Figure 10:
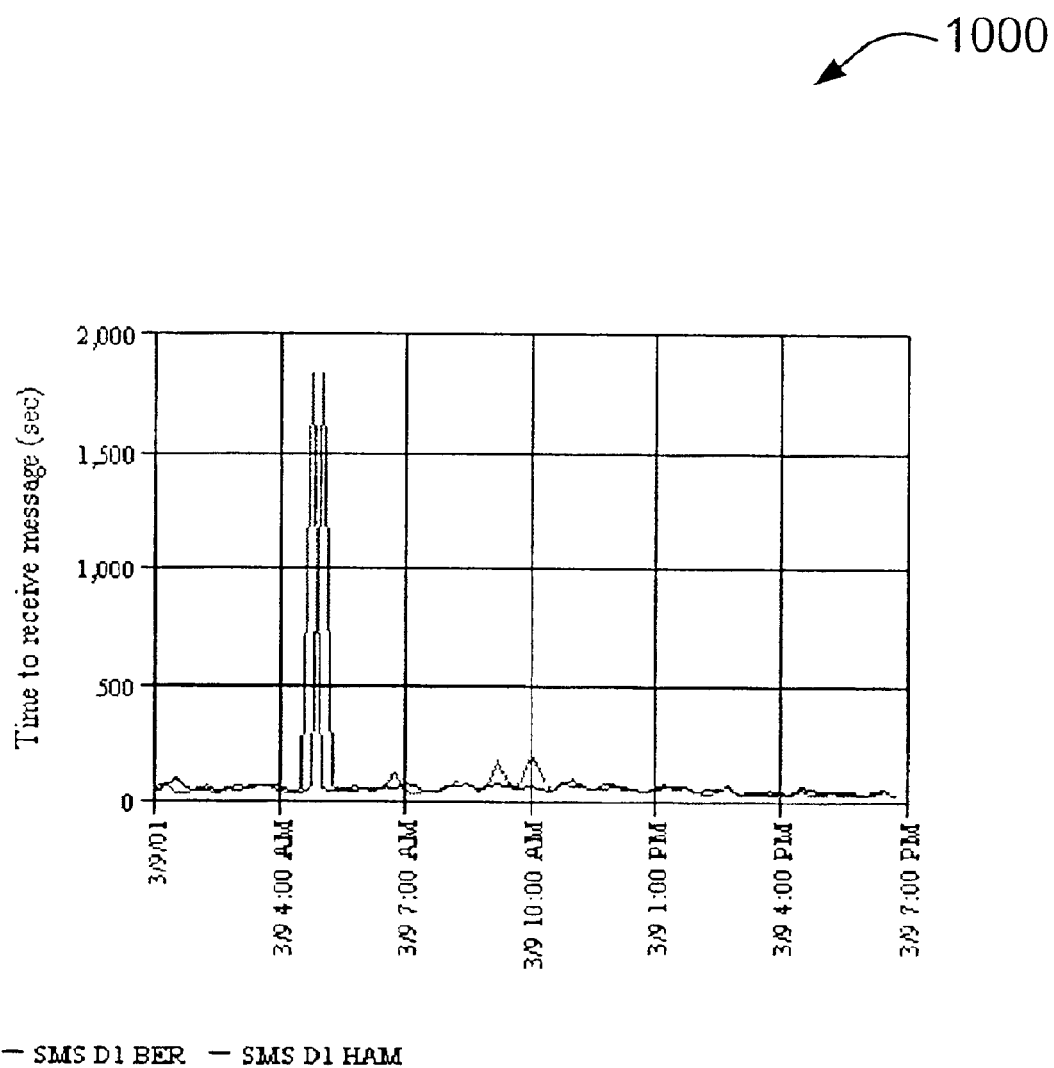
FIG. 10 shows a graph that indicates a problem with the wireless network.

FIG. 10 shows a graph 1000 that indicates a problem with the wireless network 110. The graph 1000 in FIG. 10 shows two spikes. A spike is a single data point out of line. A spike such as the two shown in graph 1000 is caused by a single probe, which took longer to be delivered than the probes sent before and after. There are multiple possible causations for a single probe taking longer to be delivered than the probes sent before and after.

One possible causation is the message retry algorithms deployed by the SMSC and the core network. If this is the cause, an attempt has been made to deliver the SMS probe. However, the message was not successfully delivered initially. This could result, for example, from a congested signaling network caused by faulty or misconfigured switching equipment.

Another possible causation is a short system down time. For this to be the cause, the delay of the message which creates the spike must be shorter than the interval between messages. Otherwise, multiple messages would be delayed.

Figure 11:
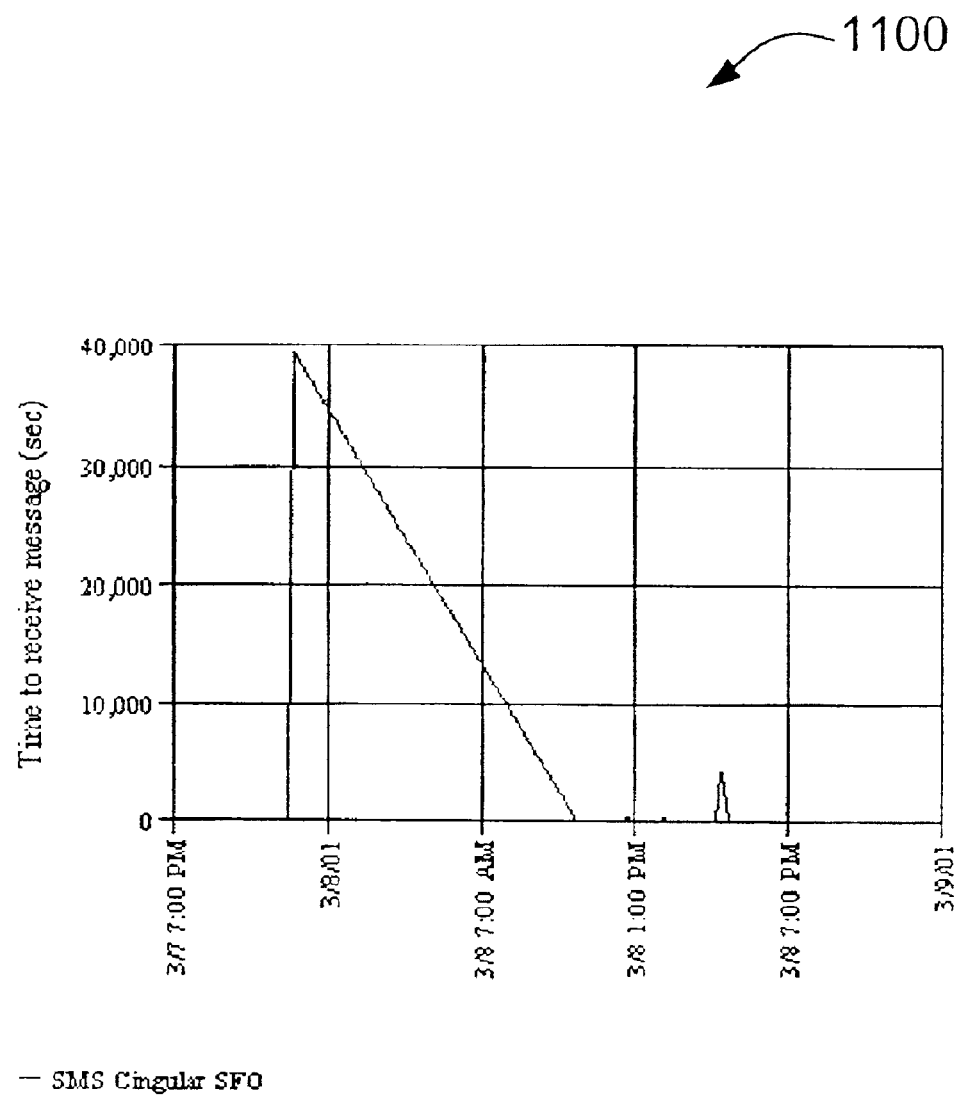
FIG. 11 shows a graph that indicates another problem with the wireless network.

FIG. 11 shows a graph 1100 that indicates another problem with the wireless network 110 The graph 1100 in FIG. 11 shows a "shark fin." The first probe in the shark fin takes longer to be delivered than the probes sent before the first probe. The probes after the first probe in the shark fin generally take less and less time to be delivered, until the last probe in the shark fin takes approximately the same amount of time to be delivered as the probes after the shark fin.

A shark fin occurs when probes are delayed and then are all delivered at approximately the same time. The probes in the shark fin are not delivered for a period of time because of a problem with the wireless network 110. The probes in the shark fin queue up and then are all delivered at substantially the same time once the problem with the wireless network 110 is corrected.

The shark fin shape indicates that probes cannot be delivered to any of the mobile terminals within a carrier network. This indicates that there is a single point of failure. This single point of failure is likely an outage of an SMTP gateway. When the gateway goes out, the probes queue up. When the gateway functions properly again, the queued probes are all delivered at substantially the same time. A shark fin pattern observed in only in a certain region or area indicates that the network infrastructure in that region or area is causing the problem in the wireless network 110.

Figure 12:
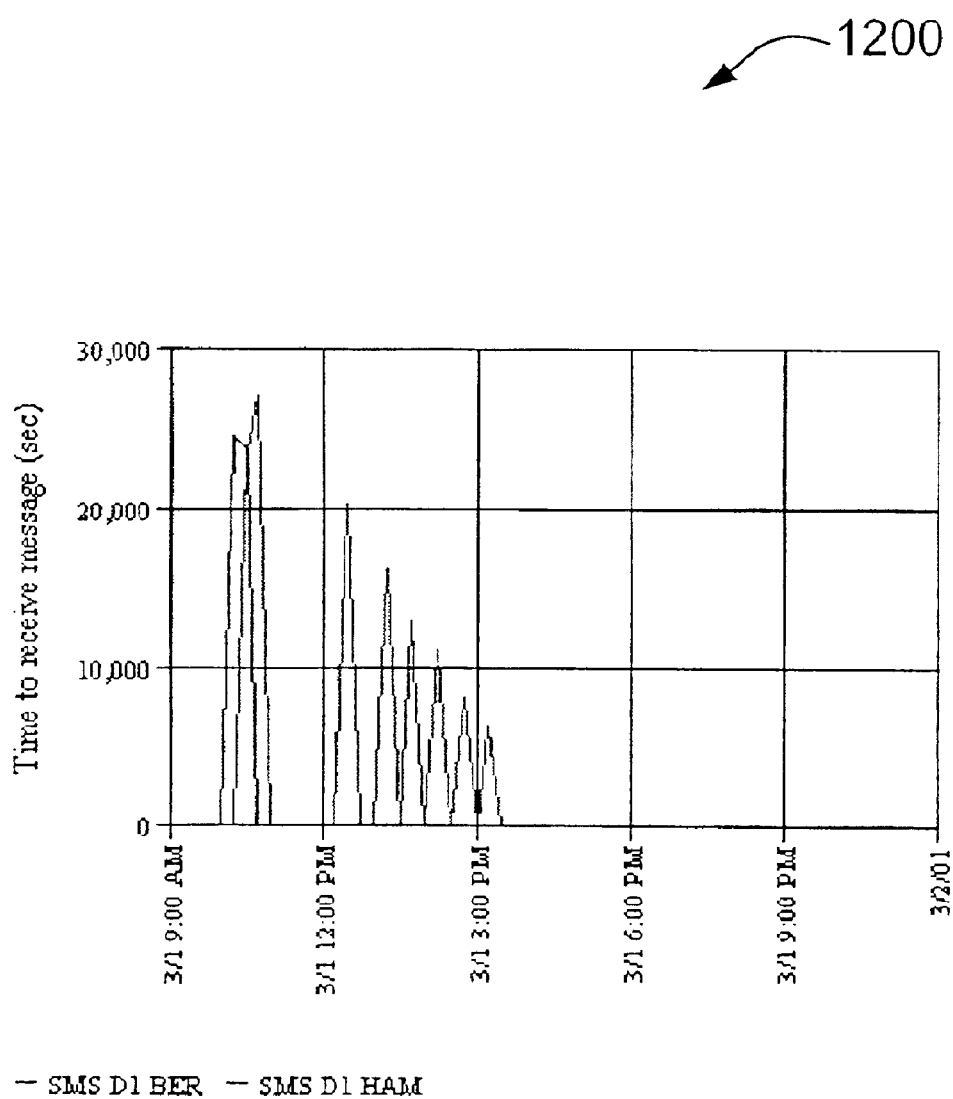
FIG. 12 shows a graph that indicates a third problem with the wireless network.

FIG. 12 shows a graph 1200 that indicates a third problem with the wireless network 110. The graph 1200 in FIG. 12 shows a "decaying shark fin." The decaying shark fin shows the overall pattern of the shark fin, as discussed with respect to FIG. 11, above. However, the decaying shark fin includes probe delivery times that indicate that some probes were delivered normally, and were not affected by the problem with the wireless network 110. These normal data points lead to the cuts in the shark fin shape.

In general, there are two different causes of the decaying shark fin pattern. The first cause is the overlaying of probe data from mobile terminals at different geographical locations. In this case, one of the geographical locations has experienced a problem with the wireless network 110 that caused a shark fin shape graph. The other geographical location is not experiencing a problem with the wireless network 110. Thus, when the data from the two locations are overlaid, there is a mix of normal probe delivery times and probe delivery times that cause the shark fin shape. This indicates that there is a problem in the first geographical location of the wireless network 110, as described above in the section on the shark fin.

The second cause of the decaying shark fin is probes that take a longer time to be delivered than normal interrupted by probes that take a normal time to be delivered. One possible problem that causes such mingling of probes that take a long time and probes that take a normal amount of time is a load-balanced SMSC cluster. In this case, the load-balancing has included a failed SMSC, which was unable to deliver the probes. Instead the probes queued up. When the failed SMSC became operational again, the queued probes were delivered at substantially the same time.

Thus, the probes sent to the failed SMSC queued up and caused the shark fin shape. The probes sent to the functioning SMSC(s) were delivered in normal amounts of time and caused the cuts in the shark fin shape.

Figure 13:
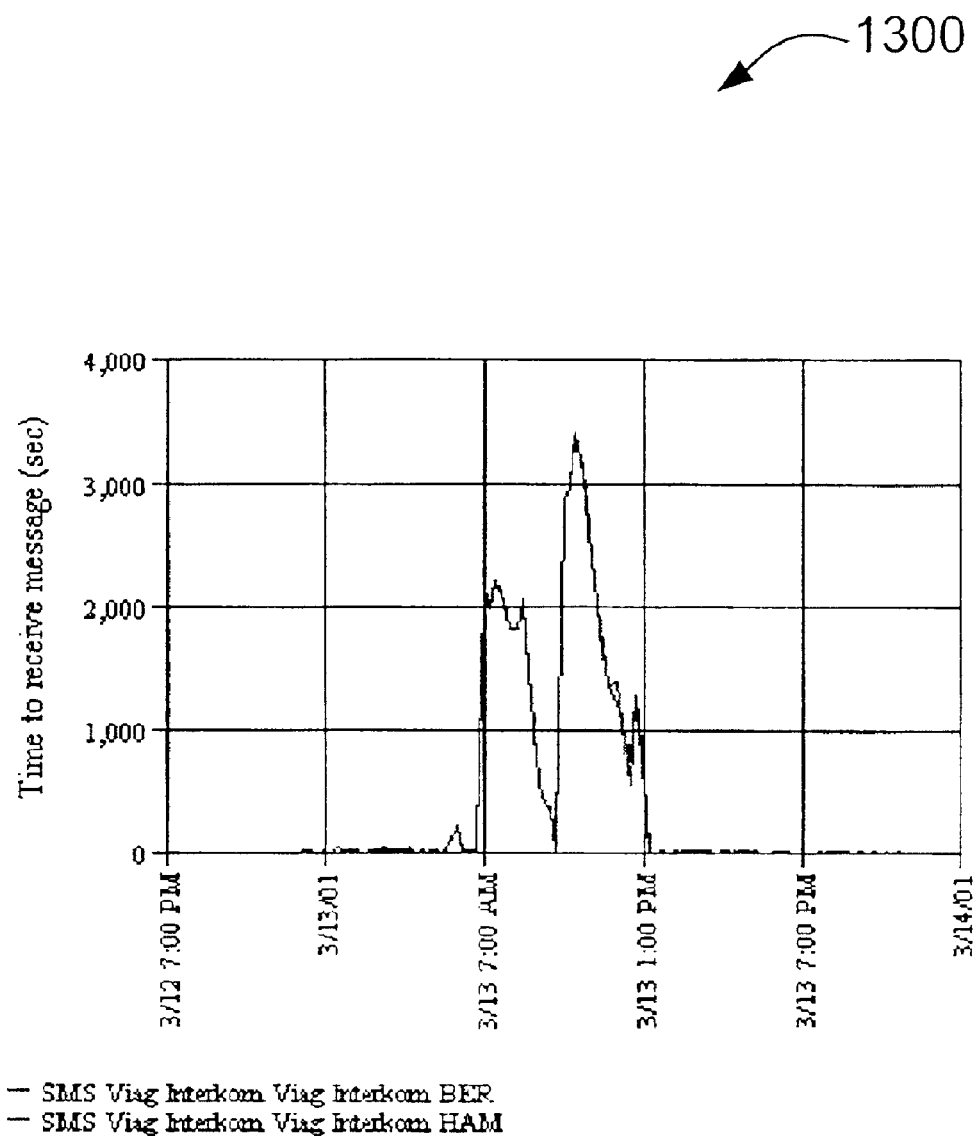
FIG. 13 shows a graph that indicates yet another problem with the wireless network.

FIG. 13 shows a graph 1300 that indicates a fourth sort of problem with the wireless network 10. The graph 1300 in FIG. 13 shows a "pig in a python." The pig in a python is characterized by a non-linear increase in the amount of times it takes to deliver successive probes. This increase is followed by a period of time where the probes take longer to deliver than normal. Finally, the pig in the python ends with a non-linear return to normal probe delivery times. The pig in a python pattern is a typical by-product known in queuing theory. Generally, the pig in a python pattern indicates overall system congestion. This can be caused, for example, by an overloaded SMSC, or a network backbone at capacity limit.

The feedback information can be used to narrow the possibilities for the source of the problems. One way to narrow the search for the problem is through geography. For each of the patterns above, if graphs for different geographical regions show similar patterns, it indicates that the problem is widespread. In contrast, if a graph for one geographical region shows a shark fin, while other geographical regions show normal, then the problem is limited to the one geographical region that shows the shark fin.

Another way to narrow the search for a problem is to view different segments of the path of a push probe separately. For example, if the overall time taken from originator to receiver is abnormally high, the data for each recorded part of the path can be studied separately. For example, the time from originator to local mail server can be studied separately. If this time is abnormally high, then the problem likely exists between the originator and the local mail server. If this time is normal, then the problem likely exists elsewhere. The different possible feedback information can be used to separately study other segments of push probes and pull probes, which allows the user to quickly identify the source of the problem.

While the invention has been particularly shown and described with reference to a preferred embodiment and alternate embodiments, it will be understood by persons skilled in the relevant art that various changes in form and details can be made therein without departing from the spirit and scope of invention. For example, different event times for push and pull probes can be measured for feedback information, different types of feedback information can be generated, and different systems and carriers can be monitored.

We claim:

1. A method for monitoring a wireless network, comprising:

generating a plurality of probes, each probe having an identifier and a destination;

sending each probe of the plurality of probes from an originator to the wireless network;

receiving the plurality of probes at the destination from the wireless network; and recording feedback information generated in response to each of the plurality of probes, the feedback information indicative of the performance of the wireless network;

wherein the originator is a wireless device at a post, and the destination is a different wireless device at a different post.

2. The method of claim 1, wherein the originator records feedback information generated in response to the plurality of probes.

3. The method of claim 2, wherein the originator sends the recorded feedback information to a server.

4. The method of claim 3, wherein the originator sends the probe identifier associated with the recorded feedback information to the server.

5. The method of claim 1, wherein the destination records feedback information generated in response to the plurality of probes.

6. The method of claim 5, wherein the destination sends the recorded feedback information to a server.

7. The method of claim 6, wherein the destination sends the probe identifier associated with the recorded feedback information to the server.

8. The method of claim 1, wherein, for each probe of the plurality of probes, a server receives the feedback information associated with the probe identifier.

9. The method of claim 1, wherein each probe of the plurality of probes is sent to the originator from a server via a network.

10. The method of claim 1, wherein the feedback information for each probe of the plurality of probes comprises a time of a first event.

11. The method of claim 10, wherein the feedback information for each probe of the plurality of probes comprises a time of a second event.

12. The method of claim 11, further comprising determining, for each probe of the plurality of probes, from the probe identifier, the time of the first event, and the time of the second event, the time between the first event and the second event.

13. The method of claim 11, wherein the second event is the time the probe is received at the destination.

14. The method of claim 10, wherein the first event is the time the probe is sent from the originator.

15. The method of claim 10, wherein the first event is the time the probe is received at a local mail server.

16. The method of claim 10, wherein the first event is the time the probe is received at a carrier gateway.

17. The method of claim 10, wherein the first event is the time the probe is received at a processing sender.

18. The method of claim 17, wherein the first event is the time the probe is sent to the destination from the processing sender.

19. The method of claim 1, wherein each probe of the plurality of probes is a Short Message Services message.

20. The method of claim 1, wherein each probe of the plurality of probes is a Simple Mail Transfer Protocol mail message.

21. The method of claim 1, wherein the recorded feedback information is received at a server.

22. The method of claim 1, further comprising sending the recorded feedback information from each probe of the plurality of probes to a user interface.

23. The method of claim 1, further comprising generating a graphical representation of the recorded feedback information.

24. The method of claim 1, further comprising sending an alert in response to a specified performance level of the wireless network.

* * * * *